United States Patent
Wada et al.

(10) Patent No.: US 7,176,437 B2
(45) Date of Patent: Feb. 13, 2007

(54) PHOTOELECTRIC CONVERSION APPARATUS AND PHOTOELECTRIC CONVERSION SYSTEM USING THE SAME

(75) Inventors: Morio Wada, Tokyo (JP); Akira Miura, Tokyo (JP); Tsuyoshi Yakihara, Tokyo (JP); Sadaharu Oka, Tokyo (JP); Chie Sato, Tokyo (JP); Katsuya Ikezawa, Tokyo (JP); Shinji Kobayashi, Tokyo (JP); Shinji Iio, Tokyo (JP); Daisuke Hayashi, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 164 days.

(21) Appl. No.: 11/065,514

(22) Filed: Feb. 23, 2005

(65) Prior Publication Data

US 2005/0194518 A1    Sep. 8, 2005

(30) Foreign Application Priority Data

Mar. 4, 2004    (JP)    ............................ P.2004-060116

(51) Int. Cl.
*H01J 40/14*    (2006.01)
*H01L 31/00*    (2006.01)
*H03F 3/45*    (2006.01)

(52) U.S. Cl. ................................... 250/214 A; 330/308
(58) Field of Classification Search ............ 250/214 A; 330/252, 308

See application file for complete search history.

(56) References Cited

U.S. PATENT DOCUMENTS 5,266,793 A  *  11/1993  Smith ...................... 250/214 A
6,919,552 B2 *   7/2005  Flower .................... 250/214 R

FOREIGN PATENT DOCUMENTS

JP         2000244458         9/2000

OTHER PUBLICATIONS

Takahashi et al., (1992) "10 GHz spacing optical frequency division multiplexer based on arrayed-waveguide grating" Electronics Letters 28(4):380-382.

* cited by examiner

*Primary Examiner*—John R. Lee
(74) *Attorney, Agent, or Firm*—Sughrue Mion, PLLC

(57) ABSTRACT

A photoelectric apparatus has a phototransistor which receives a light signal and in which a collector current thereof varies according to intensity of the received light signal, and a transistor in which a collector current thereof varies according to a base voltage thereof. The phototransistor and the transistor constitute a differential amplification circuit. At least one of the phototransistor and the transistor outputs an electric signal.

7 Claims, 5 Drawing Sheets

PHOTOELECTRIC CONVERSION APPARATUS AND PHOTOELECTRIC CONVERSION SYSTEM USING THE SAME

CROSS-REFERENCE TO RELATED APPLICATIONS

This application is based upon and claims the benefit of priority from the prior Japanese Patent Applications No. 2004-060116, filed on Mar. 4, 2004, the entire contents of which are incorporated herein by reference.

BACKGROUND OF THE INVENTION

1. Field of the Invention

The present invention relates to a photoelectric conversion apparatus which converts a light signal into an electric signal corresponding to intensity of the light signal, and to a photoelectric conversion system using the photoelectric conversion apparatus. More particularly, the invention relates to a photoelectric conversion apparatus which enables to easily convert a light signal into an electric signal having a desired magnitude to output the electric signal, and also relates to a photoelectric conversion system using the photoelectric conversion apparatus.

2. Description of the Related Art

In optical communication systems, measuring apparatuses for optical communication, optical wirings, optical computers, and so on, it is frequent that a photoelectric conversion apparatus converts light signals into electric signals, and that electric processing is performed on the electric signals in a subsequent-stage circuit. Further, in the case of using multi-input signals (for example, in the case of separating components of a multiplexed light signal, such as a wavelength division multiplexed light signal and a time division multiplexed light signal), a photoelectric conversion apparatus is provided in such a way as to be associated with each of the light signals.

Figure 4:
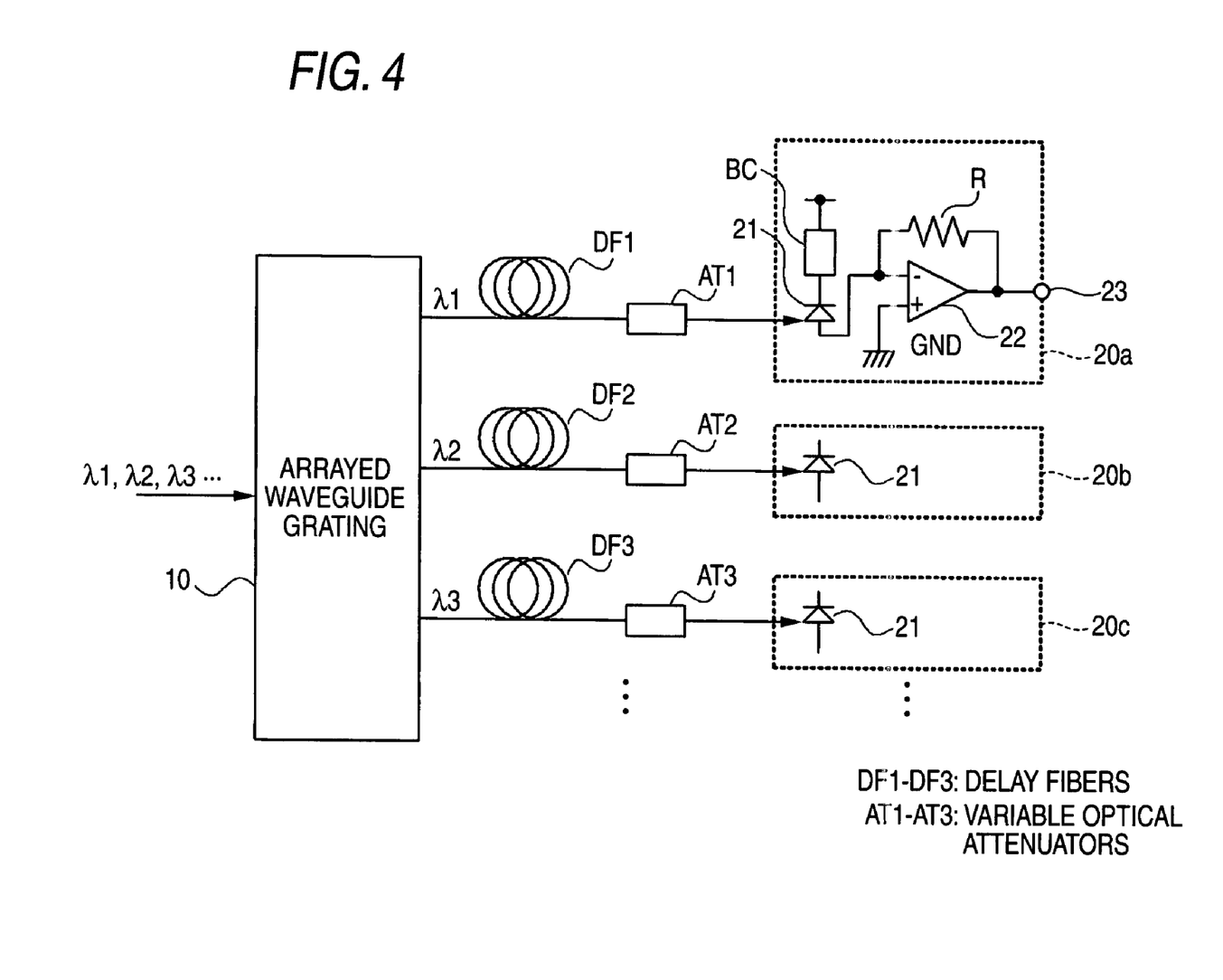
FIG. 4 is a view illustrating a configuration of a light receiving portion of an optical communication system employing a conventional photoelectric apparatus.

FIG. 4 is a view illustrating the configuration of a portion for separating multiplexed light signals and for converting the light signals into electric signals in an optical communication system (see, for example, the following document (1)). An arrayed waveguide grating 10 (hereunder abbreviated as AWG) shown in FIG. 4, to which multi-wavelength light signals transmitted in the optical communication signals (having wavelengths $\lambda_1$, $\lambda_2$, $\lambda_3$, . . . ) are inputted, demultiplexes (that is, performs wavelength-based separation of) the inputted light signals into light signals of wavelengths $\lambda_1$, $\lambda_2$, $\lambda_3$, . . . and outputs the demultiplexed light signals (see, for instance, the following document (2)).

The light signals respectively having the wavelengths are inputted from the AWG 10 to delay fibers DF1 to DF3. For example, the light signal having the wavelength $\lambda_1$ is inputted to the delay fiber DF1. The light signal having the wavelength $\lambda_2$ is inputted to the delay fiber DF2. The light signal having the wavelength $\lambda_3$ is inputted to the delay fiber DF3. Then, the delay fibers DF1 to DF3 delay the light signals by a predetermined time, and outputs the delayed light signals. Variable optical attenuators AT1 to AT3 are provided in such a way as to be associated with the delay fibers DF1 to DF3, respectively. The light signals are inputted from the delay fibers DF1 to DF3 to the variable optical attenuators AT1 to AT3, respectively. Each of the variable optical attenuators AT1 to AT3 attenuates the intensity of the light signal and outputs the attenuated light signal.

Photoelectric conversion apparatuses 20a to 20c are provided in such a manner as to be associated with the variable optical attenuators AT1 to AT3, respectively. Light signals are inputted from the variable optical attenuators AT1 to AT3 to the photoelectric conversion apparatuses 20a to 20c, which convert these light signals into electric signals and subsequently output the electric signals. Further, each of the photoelectric conversion apparatuses 20a to 20c has a photodiode 21, a resistor R, an operational amplifier 22, an output terminal 23, and a bias circuit BC. The photodiode 21 is connected to the bias circuit BC at the cathode thereof, to which a bias voltage is applied. The operational amplifier 22 is connected to the ground GND at the non-inverting input terminal thereof, and also connected to the anode of the photodiode 21 at an inverting input terminal thereof. The output terminal 23 of each of the photoelectric conversion apparatuses 20a to 20c is connected to that of the operational amplifier 22. Further, the resistor R is connected to the non-inverting input terminal and the output terminal of the operational amplifier 22 to thereby constitute a negative feedback loop.

Incidentally, FIG. 4 shows only three of each of the three kinds of constituents, that is, the delay fibers DF1 to DF3, the variable optical attenuators AT1 to AT3, and the photoelectric conversion apparatuses 20a to 20c provided in the portion. However, needless to say, a necessary number of each of such kinds of constituents may be provided therein. Additionally, the configuration of each of the photoelectric conversion apparatuses 20b and 20c is similar to that of the photoelectric conversion apparatus 20a. Thus, only the photodiode 21 is shown in this figure.

An operation of such a portion is described hereinbelow.

Wavelength division multiplexed light signals are inputted to the AWG 10. Then, the AWG 10 demultiplexes the light signals and outputs the demultiplexed light signals to the delay fibers DF1 to DF3. Subsequently, the delay fibers DF1 to DF3 delay the light signals, which are outputted from the AWG 10, and output the delayed light signals to the variable optical attenuators AT1 to AT3, respectively.

Then, the variable optical attenuators AT1 to AT3 attenuate the light signals. Incidentally, an attenuation amount is adjusted by taking differences in intensity among the light signals and those in voltage level, which are caused when the conversions are performed in the photoelectric conversion apparatuses 20a to 20c, into consideration.

Subsequently, the light signals attenuated by the variable optical attenuators AT1 to AT3 are inputted to the photodiodes 21 of the photoelectric conversion apparatuses 20a to 20c, respectively. Then, the photodiodes 21 outputs electric signals having voltage levels, the value of each of which corresponds to the intensity of the associated light signal, to a subsequent-stage electric circuit (not shown).

Figure 5:
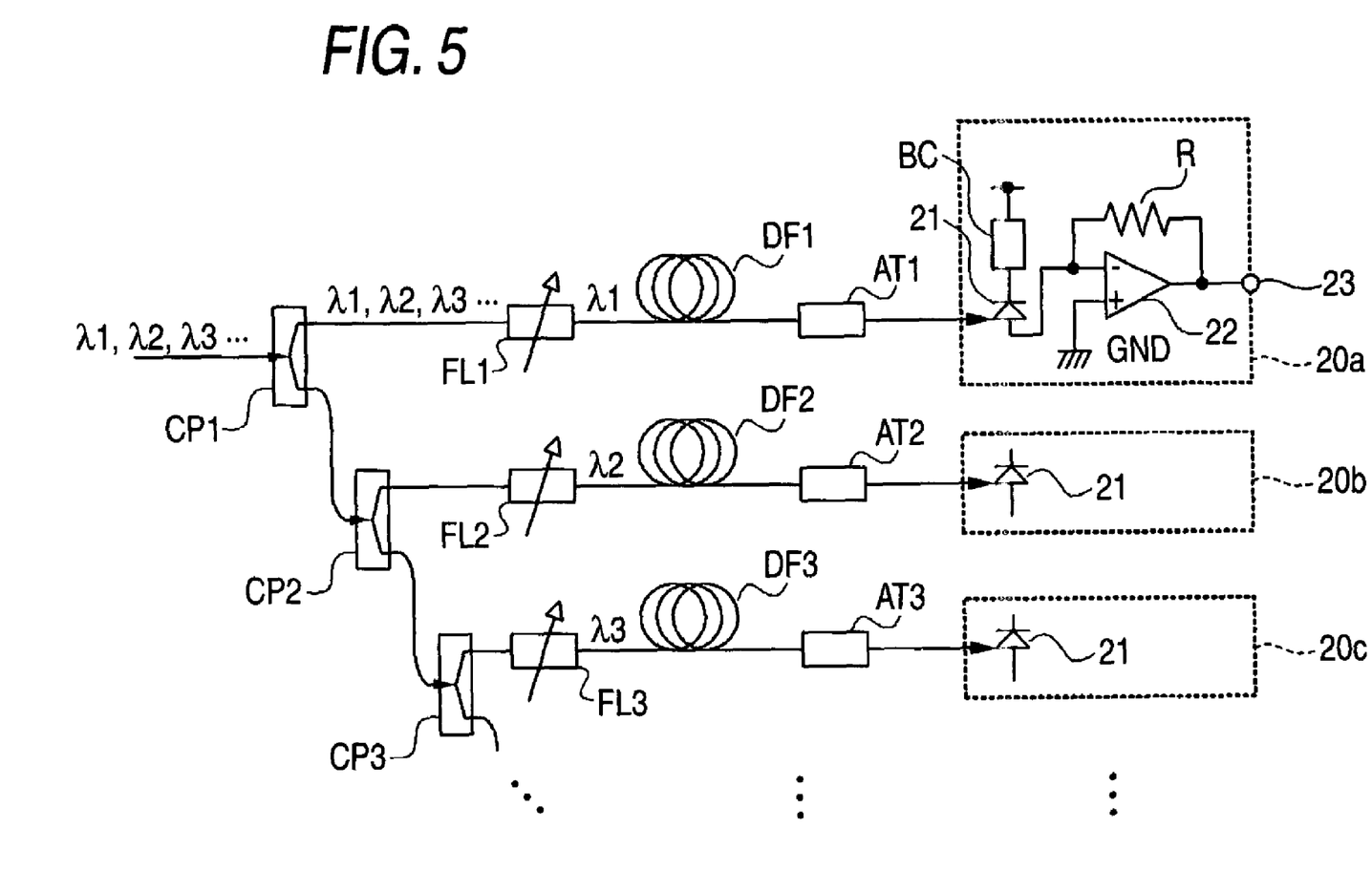
FIG. 5 is a view illustrating another configuration of the light receiving portion of the optical communication system employing the conventional photoelectric apparatus.

Next, an example of demultiplexing the light signals by using optical couplers and wavelength filters without using the AWG 10 is described hereinbelow. FIG. 5 is a view illustrating another configuration of a portion for separating components of a multiplexed light signal and converting the light signal into electric signals. In this figure, constituents, which are the same as those shown in FIG. 4, are designated by the same reference characters denoting the same constituents shown in FIG. 4. Thus, the description of such constituents is omitted herein.

As shown in FIG. 5, the optical couplers CP1 to CP3 and the variable wavelength filters FL1 to FL3 are provided in the portion, instead of the AWG 10. The optical coupler CP1, to which the wavelength division multiplexed light signal is inputted, into two light signals. Each of the optical couplers CP2 and CP3 braches the light signal, which is inputted thereto from one of output terminals of a preceding-stage optical coupler CP1 or CP2, into two light signals. The branching ratio of the intensity of each of the optical couplers is 1:1.

The light signals are inputted from other output terminals of the optical couplers CP1 to CP3 to the variable wavelength filters FL1 to FL3, respectively. The variable wavelength filters FL1 to FL3 transmit only light signals of predetermined wavelengths and output the transmitted light signals to the delay fibers DF1 to DF3, respectively.

An operation of such an apparatus is described hereinbelow.

Wavelength division multiplexed light signals are inputted to the optical coupler CP1. Then, the optical coupler CP1 branches the light signal into two light signals and outputs the two light signals to the variable wavelength filter FL1 and the optical coupler CP2. Similarly, the optical coupler CP2 branches a light signal, which is inputted thereto, into two light signals and outputs these two light signals to the subsequent-stage optical coupler CP3 and the variable wavelength filter FL2. Furthermore, similarly, the optical coupler CP3 branches the light signal inputted thereto into two light signals and outputs these two light signals to a subsequent-stage optical coupler (not shown) and to the variable wavelength filter FL3.

Further, the variable wavelength filters FL1 to FL3 transmit only the light signals of desired wavelengths and output the transmitted light signals to the delay fibers DF1 to DF3. For example, the variable wavelength filter FL1 transmits only the light signal of the wavelength $\lambda 1$. The variable wavelength filter FL2 transmits only the light signal of the wavelength $\lambda 2$. The variable wavelength filter FL3 transmits only the light signal of the wavelength $\lambda 3$.

Additionally, the operations of delaying the light signals by using the delay fibers DF1 to DF3, and of attenuating the light signal by using the variable optical attenuators AT1 to AT3, and of converting the light signals into electric signals by using the photoelectric conversion apparatuses 20a to 20c are similar to those of the apparatus shown in FIG. 4. Thus, the description of such operations is omitted herein.

The following documents are referred to as related art.

(1) JP-A-2000-244458 (Paragraph Nos. 0020 to 0024 and FIGS. 1 and 2)

(2) H. Takahashi, I. Nishi, and Y. Hibino: "10 GHz SPACING OPTICAL FREQUENCY DIVISION MULTIPLEXER BASED ON ARRAYED-WAVEGUIDE GRATING", ELECTRONICS LETTERS, Institution of Electrical Engineers, February 1992, Vol. 28, No. 4, pp. 380–382.

Thus, the demultiplexed light signals are converted by the photoelectric conversion apparatuses 20a to 20c into electric signals. However, it is necessary for processing the converted electric signals that the signal levels (for instance, a high or low voltage level) of the electric signals have the same value. Needless to say, the same goes for the case of separating components of the time division multiplexed light signal.

Thus, in a case where such signal levels are adjusted by adjusting the levels of the light signals, the variable optical attenuators AT1 to AT3 adjust those of the light signals. Alternatively, in a case where such signal levels are adjusted by converting the light signals into electric signals, an amplification circuit (not shown) is provided in a subsequent stage of each of the photoelectric conversion apparatuses 20a to 20c. Such signal levels are adjusted by this amplification circuit.

However, when the photoelectric conversion apparatuses 20a to 20c convert the light signals into the electric signals, the corresponding relation between the intensity of the light signal and the signal level of the electric signal is fixed. Thus, when all the multiplexed light signals vary or when only the light signal of a specific wavelength varies, it is necessary to adjust the attenuation amount of each of the variable optical attenuators AT1 to AT3 and the gain of the amplification circuit (not shown) according to the values of the intensity of the light signal, which is not demultiplexed, and of the intensity of the demultiplexed signal, respectively. Consequently, such adjustment is complicated and troublesome.

Furthermore, in the actual system shown in FIGS. 4 and 5, there has been a variation in the insertion loss of the individual optical components, such as the AWG 10, the optical couplers CP1 to CP3, the variable wavelength filters FL1 to FL3, the delay fibers DF1 to DF3, the variable optical attenuators AT1 to AT3, and the photodiodes 21. Thus, the adjustment cannot be achieved simply by changing the resistance value of the resistor R of each of the photoelectric conversion apparatuses. There has been necessity for fine adjustment of the attenuation amount and the gain. Thus, such adjustment is complicated and troublesome.

SUMMARY OF THE INVENTION

The object of the invention is to provide a photoelectric conversion apparatus which enables to easily convert a light signal into an electric signal having a desired signal level, and to provide a photoelectric conversion system using the photoelectric conversion apparatus.

The invention provides a photoelectric conversion apparatus, which converts a light signal into an electric signal corresponding to intensity of the light signal, having: a phototransistor which receives a light signal and in which a collector current thereof varies according to intensity of the received light signal; and a transistor in which a collector current thereof varies according to a base voltage thereof, wherein the phototransistor and the transistor constitute a differential amplification circuit, and at least one of the phototransistor and the transistor outputs an electric signal.

The photoelectric conversion apparatus further has a reference current source, wherein the reference current source is connected to an emitter of the phototransistor, and a constant-voltage power supply is connected to a collector of the phototransistor through a first resistor, the reference current source is connected to an emitter of the transistor, and a constant-voltage power supply is connected to a collector of the phototransistor through a second resistor, and the electric signal is outputted from at least one of collectors of the phototransistor and the transistor.

Furthermore, a corresponding relation between the intensity of the light signal and a voltage level of the electric signal is changed by a voltage level of the reference voltage applied to a base of the transistor.

The invention also provides a photoelectric conversion system, which converts each of a plurality of light signals into an electric signal, having: a plurality of photoelectric conversion apparatuses which has a differential amplification circuit constituted from a phototransistor and a transistor and outputs an electric signal from at least one of the phototransistor and the transistor; and a reference voltage adjusting portion which adjusts a voltage level of a reference voltage applied to a base of the transistor in each photoelectric conversion apparatus according to electric signals respectively outputted from each of the photoelectric conversion apparatuses.

Furthermore, each of the light signals is a signal obtained by performing time-based separation on a time division multiplexed light signal.

Furthermore, each of the light signals is a signal obtained by performing wavelength-based separation on a wavelength division multiplexed light signal.

Furthermore, each of the photoelectric conversions has a reference current source, the reference current source is connected to an emitter of the phototransistor, and a constant-voltage power supply is connected to a collector of the phototransistor through a first resistor, the reference current source is connected to an emitter of the transistor, and a constant-voltage power supply is connected to a collector of the phototransistor through a second resistor, and the electric signal is outputted from at least one of collectors of the phototransistor and the transistor.

The invention has the following advantages.

According to the photoelectric conversion apparatus, the phototransistor and the transistor constitute a differential amplification circuit. The differential input voltage between a voltage due to a light signal inputted to the phototransistor and a reference voltage inputted to the transistor is converted into a single-ended current. Thus, the corresponding relation between the intensity of the light signal inputted to the phototransistor and the voltage level of an electric signal to be outputted is determined only by adjusting the voltage level of the reference voltage. Consequently, the light signal can easily be converted into the electric signal having a desired signal level.

According to the photoelectric conversion apparatus, the corresponding relation between the intensity of the light signal and the voltage level of the electric signal to be outputted is changed according to the voltage level of the reference voltage. Thus, even when the intensity of the light signal inputted to the phototransistor varies, an electric signal, whose signal level is always constant, can be outputted. Consequently, signal processing to be performed in the subsequent-stage electric circuit is facilitated.

According to the photoelectric conversion systems, the reference voltage control portion adjusts the voltage level of the reference voltage applied to a base of the transistor in each photoelectric conversion apparatus according to electric signals outputted from the each of the photoelectric conversion apparatus. Consequently, the signal level of the electric signal can be made to be equal to each other, among the plurality of photoelectric conversion apparatuses.

DETAILED DESCRIPTION OF THE PREFERRED EMBODIMENTS

Embodiments of the invention are described by referring to the accompanying drawings.

[First Embodiment]

Figure 1:
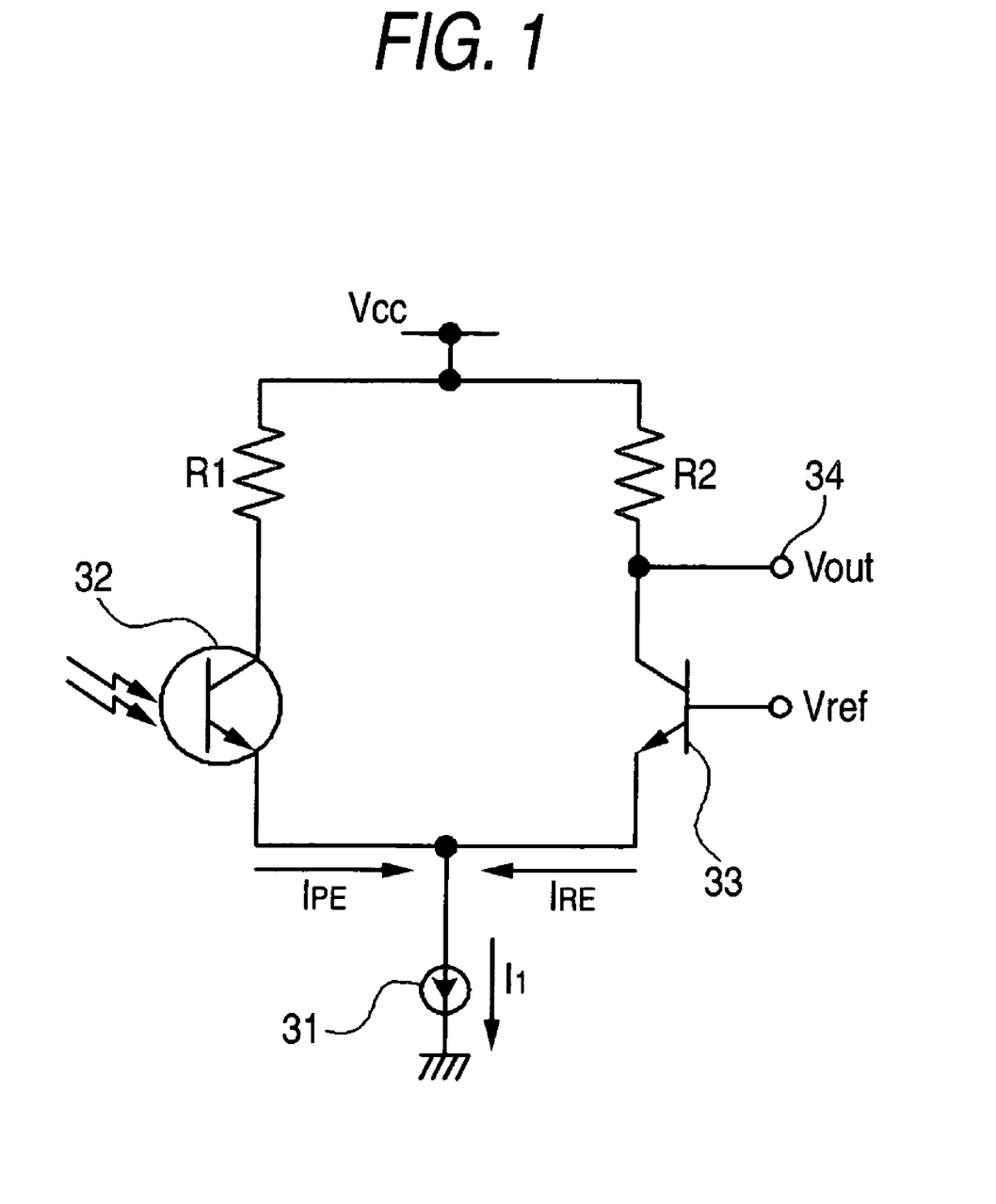
FIG. 1 is a view illustrating the configuration of a first embodiment of the invention.

FIG. 1 is a view illustrating the configuration of a photoelectric conversion apparatus. As shown in FIG. 1, a reference current source 31 outputs a constant reference current $I_1$ to the ground GND.

A phototransistor 32 is connected to the reference current source 31 at the emitter thereof. The collector thereof is connected to a constant-voltage power supply $V_{cc}$ through a first resistor R1. The phototransistor 32 receives a light signal (for example, the demultiplexed light signal shown in FIGS. 4 and 5). A collector current $I_{PE}$ of the phototransistor 32 varies according to the intensity of the received light signal.

Figure 2:
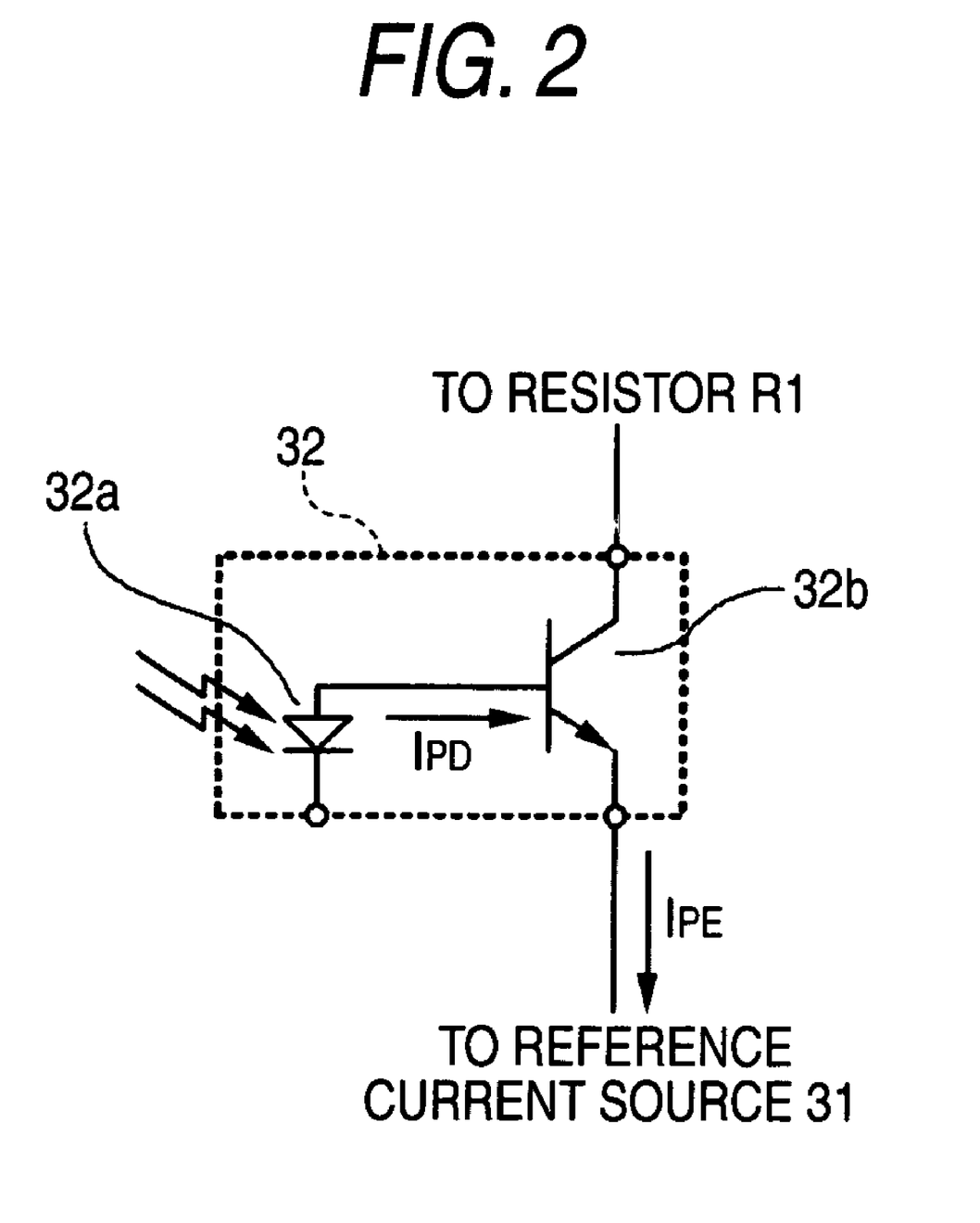
FIG. 2 is a view illustrating an equivalent circuit of a phototransistor.

Referring next to FIG. 2, there is shown an equivalent circuit of the phototransistor 32. In this figure, constituents, which are the same as those shown in FIG. 1, are designated by the same reference characters used for denoting such constituents in FIG. 1. Thus, the description of such constituents is omitted herein. As shown in FIG. 2, a photodiode 32a, to which a light signal is inputted, outputs a photocurrent $I_{PD}$ corresponding to the intensity of the light signal. A transistor 32b is connected to the resistor R1 at the emitter thereof. The collector thereof is connected to the reference current source 31. The photocurrent $I_{PD}$ is inputted to the base thereof.

Referring back to FIG. 1, an npn-type bipolar transistor 33 is connected to the reference current source 31 at the emitter thereof. The collector thereof is connected to the constant-voltage power supply $V_{cc}$ through a second resistor R2. A reference voltage is applied to the base thereof. A collector current $I_{RE}$ of the transistor 33 varies according to the reference voltage. That is, the phototransistor 32 and the transistor 33 are connected to the same reference current source 31 and constitute a differential amplification circuit. An output terminal 34 is provided between the collector of the transistor 33 and the resistor R2 and outputs an electric signal obtained by converting a light signal.

An operation of such an apparatus is described hereinbelow.

The reference current source 31 always outputs a constant reference current $I_1$. On the other hand, when a light signal is inputted to the phototransistor 32, a photocurrent $I_{PD}$ corresponding to the intensity of this light signal is outputted therefrom. Consequently, a current $I_{PE}$ is outputted to the reference current source 31 through the constant-voltage power supply $V_{cc}$, the resistor R1, and the phototransistor 32. Generally, the current $I_{PE}$ given by the following equation is outputted from the emitter thereof. Incidentally, $h_{FE}$ represents a current gain of the phototransistor 32.

$$I_{PE} = I_{PD} + h_{FE} \times I_{PD}$$
$$= (1 + h_{FE}) \times I_{PD}$$

Thus, the phototransistor 32 outputs the current $I_{PE}$ corresponding to the intensity of the light signal. On the other hand, when the reference voltage is applied to the base of the transistor 33, the current $I_{RE}$ is outputted to the reference current source 31 through the constant-voltage power supply $V_{cc}$, the resistor R2, and the transistor 33. Thus, the current $I_{RE}$ corresponding to the voltage level of the reference voltage is outputted thereto. Consequently, an electric signal having a voltage level, which corresponds to the collector current of the transistor 33, is outputted from the output terminal 34.

Furthermore, the phototransistor 32 and the transistor 33 are connected to the common reference current source 31. Thus, a sum of the currents IPE and IRE is a constant amount of the current as expressed by the following equation.

$$I_1 = I_{PE} + I_{RE}$$

That is, even when the voltage level $V_{ref}$ of the reference voltage is constant, the voltage level $V_{out}$ at the output terminal 34 varies according to the intensity of the light signal inputted to the phototransistor 32. Conversely, even when the intensity of the light signal is constant, the voltage level $V_{out}$ at the output terminal 34 varies according to the voltage level $V_{ref}$ of the reference voltage.

Hence, the corresponding relation between the intensity of the light signal inputted to the phototransistor 32 and the voltage level of the electric signal outputted from the output terminal 34 can be changed only by adjusting the voltage level $V_{ref}$ of the reference voltage.

Thus, the differential amplification circuit is constituted by the phototransistor 32 and the transistor 33, so that the differential input voltage between the voltage due to the light signal inputted to the phototransistor 32 and the reference voltage inputted to the transistor 33 is converted into the single-ended current $I_1$. Therefore, the corresponding relation between the intensity of the light signal inputted to the phototransistor 32 and the voltage level of the electric signal outputted from the output terminal 34 is determined only by adjusting the voltage level $V_{ref}$ of the reference voltage. Consequently, a light signal can easily be converted into an electric signal having a desired signal level.

Further, because the corresponding relation between the intensity of the light signal and the voltage level of the electric signal outputted from the output terminal 34 is changed by adjusting the voltage level $V_{ref}$ of the reference voltage, an electric signal, whose signal level is always constant, can be outputted even when the intensity of a light signal inputted to the phototransistor 32 varies. Consequently, the signal processing to be performed in the subsequent-stage electric circuit is facilitated.

Furthermore, it is unnecessary to provide a variable optical attenuator, which is expensive in comparison with an optical attenuator whose attenuation amount is fixed, and a subsequent-stage amplification circuit in the system. Thus, the cost thereof is reduced. The configuration thereof is simplified. Additionally, the entire photoelectric conversion circuit including the phototransistor 32 can easily be manufactured on a semiconductor mounted on the same substrate.

[Second Embodiment]

Figure 3:
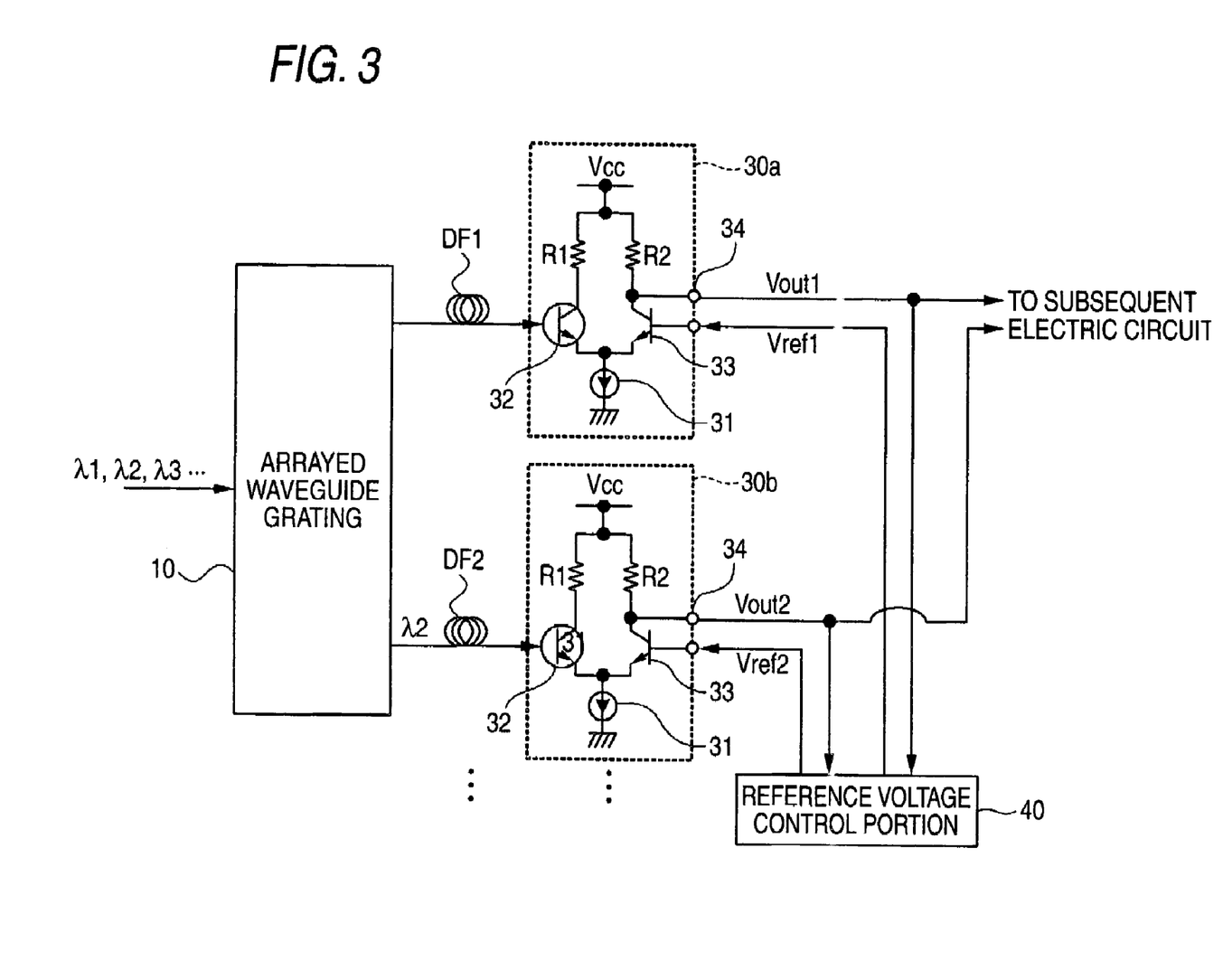
FIG. 3 is a view illustrating the configuration of a second embodiment of the invention.

Referring next to FIG. 3, which is a view illustrating a photoelectric conversion system, there is shown an example of using a photoelectric conversion system, which employs the photoelectric conversion apparatus illustrated in FIG. 1, in a light receiving portion of an optical communication system. In this figure, components, which are the same as those shown in FIGS. 1 and 4, are designated by the same reference characters denoting such components shown in FIGS. 1 and 4. Thus, the description of such components is omitted herein. Further, FIG. 3 shows only a part for converting light signals of wavelengths λ1 and λ2 into electric signals.

As shown in FIG. 3, the variable optical attenuator is completely removed from such a part. Photoelectric conversion apparatuses 30a and 30b are provided therein in such a way as to be associated with delay fibers DF1 and DF2, respectively. A light signal having a wavelength λ1 is inputted from the delay fiber DF1 to the photoelectric conversion apparatus 30a. A light signal having a wavelength λ2 is inputted from the delay fiber DF2 to the photoelectric conversion apparatus 30b. Further, the photoelectric conversion apparatuses 30a and 30b convert the light signals of the wavelengths λ1 and λ2 into electric signals, respectively, and output the electric signals from the output terminals 34 thereof. Incidentally, the photoelectric conversion apparatuses 30a and 30b are those shown in FIG. 1.

Furthermore, a reference voltage control portion 40 is newly provided therein. Electric signals are inputted from the photoelectric conversion apparatuses 30a and 30b to the reference voltage control portion 40, which outputs reference voltages to the photoelectric conversion apparatuses 30a and 30b. Incidentally, the photoelectric conversion apparatuses 30a and 30b and the reference voltage control portion 40 constitute the photoelectric conversion system.

An operation of such a portion is described hereinbelow.

Similarly to the portion shown in FIG. 4, an AWG 10 demultiplexes a wavelength division multiplexed light signal and outputs a light signal of a wavelength λ1 and a light signal of a wavelength λ2 to a delay fiber DF1 and a delay fiber DF2, respectively. Then, the delay fibers DF1 and DF2 delay the light signals, which are inputted from the AWG 10, by a predetermined time, and outputs the delayed signals to the photoelectric conversion apparatuses 30a and 30b.

Subsequently, the photoelectric conversion apparatus 30a converts the optical of the wavelength λ1 into an electric signal having a voltage level $V_{out1}$, which corresponds to the intensity of this light signal, and outputs this electric signal to a subsequent-stage electric circuit (not shown) and the reference voltage control portion 40. Similarly, the photoelectric conversion apparatus 30b converts the optical of the wavelength λ2 into an electric signal having a voltage level $V_{out2}$, which corresponds to the intensity of this light signal, and outputs this electric signal to a subsequent-stage electric circuit (not shown) and the reference voltage, control portion 40.

Subsequently, the reference voltage control portion 40 analyzes the voltage levels $V_{out1}$ and $V_{out2}$ of electric signals, into which light signals each having a high level is converted, and judges whether or not each of the electric signals has a predetermined voltage level. Then, in a case where an error occurs, the reference voltage control portion 40 changes the voltage levels $V_{ref1}$ and $V_{ref2}$ of the reference voltages inputted to the bases of the transistors 33 of the photoelectric conversion apparatuses 30a and 30b.

For example, when the voltage level $V_{out1}$ of the electric signal inputted from the photoelectric conversion apparatus 30a is too low, the reference voltage control portion 40 raises the voltage level $V_{ref1}$ of the reference voltage to be inputted to the photoelectric conversion apparatus 30a. Conversely, when the voltage level $V_{out2}$ of the electric signal inputted from the photoelectric conversion apparatus 30b is too high, the reference voltage control portion 40 lowers the voltage level $V_{ref2}$ of the reference voltage to be inputted to the photoelectric conversion apparatus 30b.

Consequently, the voltage levels $V_{out1}$ and $V_{out2}$ of the electric signals respectively outputted from the photoelectric conversion apparatus 30a and 30b are adjusted to the same voltage level.

Thus, the reference voltage control portion 40 adjusts the voltage levels $V_{ref1}$ and $V_{ref2}$ of the reference voltages to be inputted to the photoelectric conversion apparatuses 30a and 30b according to the signal levels of the electric signals outputted from the photoelectric conversion apparatus 30a and 30b. Consequently, between the photoelectric conversion apparatuses 30a and 30b, the signal levels of the electric signals can be set at the same level. Thus, the signal processing to be performed in the subsequent-stage electric circuit can be facilitated. Moreover, it is unnecessary to provide a variable optical attenuator, which is expensive in comparison with an optical attenuator whose attenuation amount is fixed, and a subsequent-stage amplification circuit in the system. Thus, the cost thereof is reduced.

Incidentally, the invention is not limited to these embodiments. The following modifications may be made.

Although the foregoing description has described the configuration of the apparatus shown in FIG. 1, in which the electric signal is outputted from the collector of the transistor 33, the electric signal may be outputted from the collector of the phototransistor 32. Alternatively, the electric signals may be outputted from both the collector of the phototransistor 32 and that of the transistor 33.

Although the foregoing description has described the configuration of the apparatus shown in FIG. 3, in which the wavelength division multiplexed light signal is demultiplexed by the AWG 10, such signals may be demultiplexed by using the optical couplers C1 to CP3 and the variable wavelength filters FL1 to FL3, as shown in FIG. 5, instead of the AWG 10. Alternatively, the apparatus may be modified so that the wavelength-based separation is performed on time division multiplexed light signals, instead of the wavelength division multiplexed signals, and that subsequently, the separated light signals are converted into electric signals. In this case, it is sufficient to achieve the time-based separation of the multiplexed light signal. Thus, the variable wavelength filters FL1 to FL3 are unnecessary. Then, preferably, the light signals are delayed by each of the delay fibers DF1 to DF3 by a predetermined time. Subsequently, the time-based separation of the delayed light signals is performed by synchronizing the light signals with one another. Thereafter, the light signals are outputted to the photoelectric conversion apparatus shown in FIG. 1.

Further, FIG. 3 shows only two of each of the two kinds of constituents, that is, the delay fibers DF1 and DF2, and the photoelectric conversion apparatuses 30a and 30b provided in the portion. However, needless to say, a necessary number of each of such kinds of constituents may be provided therein.

Additionally, FIG. 3 shows the configuration obtained by applying the photoelectric apparatus according to the invention and the photoelectric conversion system using this photoelectric apparatus to the light receiving portion of the optical communication system. However, the photoelectric apparatus according to the invention and the photoelectric conversion system using this photoelectric apparatus may be applied to an apparatus for converting light signals into electric signals (for example, measuring apparatuses for optical communication, optical wirings, and optical computers), in addition to the optical communication system.

What is claimed is:

1. A photoelectric conversion apparatus, which converts a light signal into an electric signal corresponding to intensity of the light signal, comprising:

a phototransistor which receives a light signal and in which a collector current thereof varies according to intensity of the received light signal; and a transistor in which a collector current thereof varies according to a base voltage thereof, wherein the phototransistor and the transistor constitute a differential amplification circuit, and at least one of the phototransistor and the transistor outputs an electric signal.

2. The photoelectric conversion apparatus according to claim 1, further comprising:

a reference current source, wherein the reference current source is connected to an emitter of the phototransistor, and a constant-voltage power supply is connected to a collector of the phototransistor through a first resistor, the reference current source is connected to an emitter of the transistor, and a constant-voltage power supply is connected to a collector of the phototransistor through a second resistor, and the electric signal is outputted from at least one of collectors of the phototransistor and the transistor.

3. The photoelectric conversion apparatus according to claim 1, wherein a corresponding relation between the intensity of the light signal and a voltage level of the electric signal is changed by a voltage level of the reference voltage applied to a base of the transistor.

4. A photoelectric conversion system, which converts each of a plurality of light signals into an electric signal, comprising:

a plurality of photoelectric conversion apparatuses which has a differential amplification circuit constituted from a phototransistor and a transistor and outputs an electric signal from at least one of the phototransistor and the transistor; and a reference voltage adjusting portion which adjusts a voltage level of a reference voltage applied to a base of the transistor in each photoelectric conversion apparatus according to electric signals respectively outputted from each of the photoelectric conversion apparatuses.

5. The photoelectric conversion system according to claim 4, wherein each of the light signals is a signal obtained by performing time-based separation on a time division multiplexed light signal.

6. The photoelectric conversion system according to claim 4, wherein each of the light signals is a signal obtained by performing wavelength-based separation on a wavelength division multiplexed light signal.

7. The photoelectric conversion system according to claim 4, wherein each of the photoelectric conversions has a reference current source, the reference current source is connected to an emitter of the phototransistor, and a constant-voltage power supply is connected to a collector of the phototransistor through a first resistor, the reference current source is connected to an emitter of the transistor, and a constant-voltage power supply is connected to a collector of the phototransistor through a second resistor, and the electric signal is outputted from at least one of collectors of the phototransistor and the transistor.

* * * * *